No. 842,726. PATENTED JAN. 29, 1907.
M. V. TRIMBLE.
DISH WASHER.
APPLICATION FILED JUNE 19, 1906.
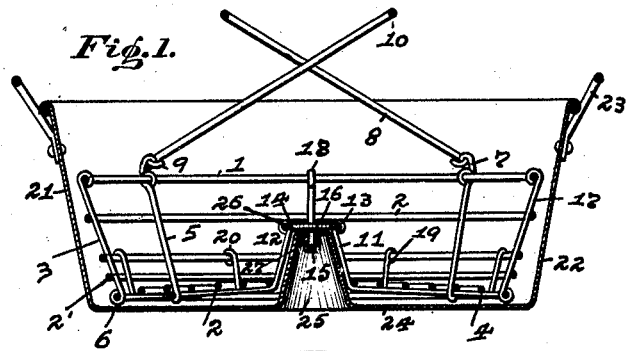
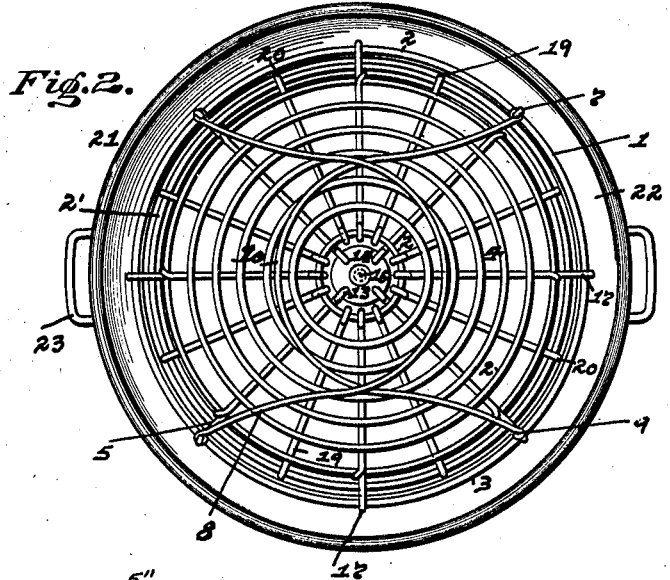
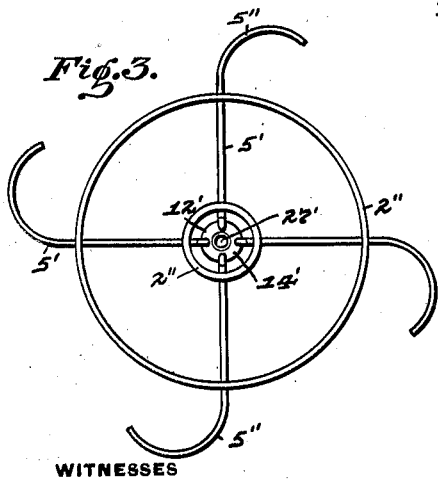
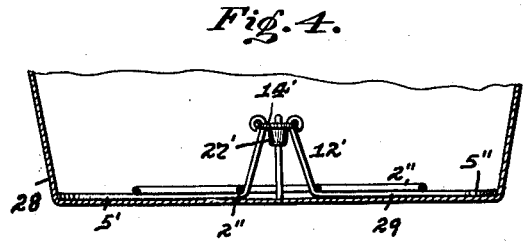
WITNESSES
INVENTOR
Minna Virginia Trimble,
By J. N. Cooke,
Attorney.

UNITED STATES PATENT OFFICE.

MINNA VIRGINIA TRIMBLE, OF BELLEVUE, PENNSYLVANIA.

DISH-WASHER.

No. 842,726. Specification of Letters Patent. Patented Jan. 29, 1907.

Application filed June 19, 1906. Serial No. 322,369.

*To all whom it may concern:*

Be it known that I, MINNA VIRGINIA TRIMBLE, a resident of Bellevue, in the county of Allegheny and State of Pennsylvania, have invented a new and useful Improvement in Dish-Washers; and I do hereby declare the following to be a full, clear, and exact description thereof.

My invention relates to dish-washers, and has special reference to that class of dish-washers wherein the dishes, &c., are placed in a basket of wire or other suitable material which is then placed in a pan or other receptacle containing a body of water, so that said basket is immersed and moved in such a manner as to cause currents to flow around the dishes, &c., to cleanse them.

The object of my invention is to provide such a form of a dish-washer which will be exceedingly cheap, durable, and economic in construction and will be capable of being operated in a rapid, effective, and convenient manner without subjecting the hands to contact with the water for cleaning the dishes, &c., as well as one in which the dish-holder can be used for carrying and draining the dishes.

My invention consists, generally stated, in the novel arrangement, construction, and combination of parts, as hereinafter more specifically set forth and described, and particularly pointed out in the claims.

To enable others skilled in the art to which my invention appertains to construct and use my improved dish-washer, I will describe the same more fully, referring to the accompanying drawings, in which—

Figure 1 is a vertical central section of my improved dish-washer. Fig. 2 is a plan or top view of the same. Fig. 3 is a plan or top view of a device for use with my invention in connection with an ordinary pan or receptacle. Fig. 4 is a vertical section of a portion of an ordinary pan or receptacle with the device shown in Fig. 3 applied thereto.

Like symbols of reference herein indicate like parts in each of the figures of the drawings.

As illustrated in the drawings, 1 represents a basket or holder which is open-topped and made of the concentric wire hoops or rings 2, which are set horizontally to form the outwardly-flaring sides 3 and bottom 4, which is inclined upwardly from the lower end of the sides 3 and toward the center of the holder. Main supporting-wires 5 extend along and under the rings 2, forming the bottom 4, in order to be connected thereto and are bent at the outer ends of said bottom portions to form the loops 6 for acting as legs for the holder. From such loops 6 the wires 5 extend inwardly along the rings 2, forming the sides 3 of the holder, in order to be connected thereto, and then they are bent around and connected to the uppermost ring 2 on said sides, while each alternate one of said main wires 5 is also bent above said upper ring to form the loops 7. U-shaped bails or handles 8, formed of wire, are loosely connected to the loops 7 by means of loops 9, formed at each end of the same, and the handle end portions 10 of the bails are of such a length as to extend beyond the center of the holder 1 in order that they can cross each other when lying within the holder or when raised for operating, so that the end portions 10 can be brought together in order that they can be grasped by one hand.

The inner end of the main wires 5 are bent upwardly and inwardly, as at 11, in order to form the raised or pyramidal portion 12 of the holder 1 and are connected by loops 13 bent thereon to a central plate 14. The plate 14 forms the top of pyramidal portion 12 and from the under side of the same projects the pivot-pin 15, which is preferably riveted thereto and has a washer 16 thereon.

Supporting-wires 17 intermediate of the main wires 5 are connected to the innermost ring 2 of the bottom 4 and to the uppermost ring 2 of the sides 3 on the holder 1 by the loops 18, bent on said wires around said rings, and said wires 17 extend along the rings 2 of said bottom and sides and are connected thereto in like manner as the wires 5. Shorter supporting-wires 19 extend from the innermost ring 2 of the said bottom 4 along said bottom and sides 3 in like manner as the wires 5 and 17 and are connected to one main ring 2 on the sides 3, located above the outer main ring 2 on the bottom 4, and to said bottom inner ring by means of the loops 20. An intermediate ring 2' is placed between the outer ring 2 on the bottom 4 and the ring 2 above the same on the sides 3, which ring 2' is connected to the wires 5, 17, and 19 in like manner as the other intermediate rings 2 on said sides between the same and the uppermost ring 2 and outer ring 2 on the sides 3 and bottom 4, respectively. This ring 2', with the use of the wires 19, will provide for smaller spaces between the rings and wires forming the bottom 4 and lower part of the sides 3, so that spoons, small dishes, &c., can be held and confined within the holder 1.

A metallic receptacle or pan 21, having the usual outwardly-flaring sides 22 and handles 23 thereon, is adapted to confine and hold the holder 1, and its bottom 24 is provided with the raised or pyramidal portion 25 struck up or bent inward from the same. The top 26 of the pyramidal portion 25 is bent down within such portion 25 in order to form a seat or socket 27 therein for the pivoting of the holder 1 to said portion, as hereinafter described.

When it is desired to use my improved dish-washer, the dishes, &c., are placed within the holder 1 and such holder is placed within the pan 21. The pan 21 contains the water for cleansing the dishes in the holder 1, and such holder is set for operating in the pan 21 by placing the pin 15 on the portion 12 of the holder within the seat 27 in the portion 25 of the pan, so that said holder will be thus pivoted within said pan, and by grasping the handles 10 of the bails 8 on said holder in one hand in order to bring them together above the holder and pan the holder is oscillated on its pivot-pin 15 within the seat or socket 27 until the dishes are clean. After said dishes are thus cleansed the holder 1, containing the same, is lifted out of the pan 21 and rinsed in a similar manner in a panful of clean water or in any other manner, after which they may be removed from the holder and set away to drain and dry.

If desired, my improved dish-washer can be used with an ordinary dish-pan or other receptacle, such as is shown at 28 in Fig. 4, in which case a suitable wire frame 29 is provided, having the pyramidal portion 12' formed thereon by means of the plate 14', and from this plate the radial supporting-wires 5' can extend to form the bottom 4 and such portion 12' in like manner as before described. In such case the outer ends of the wires 5' are provided with bent portions 5", and a series of rings 2", like the rings used for the bottom 4 of the holder, are connected to said wires 5' to support the same. In the operation of cleansing the dishes in this case the frame 29 is placed within the pan 28, and the wires 5, being formed of spring metal, will permit the outer ends of the same to be bent to form the portions 5" to allow them to be adjusted and come against the sides of the pan to hold the frame in position. The holder 1 containing the dishes to be cleansed is placed in position on the frame 29 by its pivot-pin 15 fitting in its seat or socket 27' in the portion 12' of said frame, and then the operations for cleansing said dishes are continued as before described. In this construction the frame 29 can be adjusted to enable different sizes of pans to be used by simply bending the ends of the wires 5' to form bent portions 5", so that they will fit against the sides of the particular-sized pan used.

It will be obvious that the raising of the pivotal point of the holder above the bottom of the same to center the holder will have a tendency to overcome the possible tilting of the holder, and thereby prevent any friction by the sides or bottom of the holder coming in contact with the sides and bottom of the pan.

It will thus be seen that my improved dish-washer may be comprehended and operated by any person of ordinary intelligence and by one hand, while its construction is such that it can be easily and quickly inserted into and removed from the washer or rinser with its load of dishes. The construction is also of such a form that no cover for the pan is required during the cleansing of the dishes for the centering of the holder or for any other purpose, and owing to the facility with which the holder may be handled a great many pieces can be washed and dried in a very short time, and one holder may be filled and washed and set aside to rinse and dry while another holder is filled and washed.

The connection between the rings and supporting-wires may be made in any manner, as by twisting of thin wires around the same and at their joining points, and then such holder dipped in a tinning or galvanizing vat in order to make a solidly-connected holder, or it may be formed of tinned or galvanized wire and suitably connected together.

Various other modifications and changes in the construction and design of the various parts of my improved dish-washer may be resorted to without departing from the spirit of the invention or sacrificing any of its advantages.

What I claim as my invention, and desire to secure by Letters Patent, is—

1. In a dish-washer, the combination with a receptacle or pan having a raised socket therein, of a basket within said pan, and means for removably pivoting said basket within and around said socket and above the bottom of said basket.

2. In a dish-washer, the combination with a receptacle or pan having a raised socket therein, of a basket within said pan, and means within said basket for removably pivoting said basket within and around said socket and above the bottom of said basket.

3. In a dish-washer, the combination with a receptacle or pan provided with a raised portion on the bottom thereof having a seat therein, of a basket within said pan, a raised portion on the bottom of said basket, and a pin on the raised portion of said basket for fitting within said seat to removably pivot said basket.

4. In a dish-washer, the combination with a receptacle or pan, of a removable frame within said pan, a basket within said pan, and means for removably pivoting said basket to said frame above the bottom of the basket.

5. In a dish-washer, the combination with a receptacle or pan, of a removable frame within said pan, a basket within said pan, and means within said basket for removably pivoting the same to said frame above the bottom of the basket.

6. In a dish-washer, the combination with a receptacle or pan, of a removable frame within said pan, and a basket within said pan having a raised portion thereon for removably pivoting said basket to said frame above the bottom of said basket.

7. In a dish-washer, the combination with a receptacle or pan, of a removable frame within said pan having a raised portion thereon, and a basket within said pan having a raised portion thereon for removably pivoting said basket to said frame above the bottom of said basket.

8. In a dish-washer, the combination with a receptacle or pan, of a removable frame within said pan having a raised portion thereon and provided with a seat therein, a basket within said pan having a raised portion on the bottom of the same, and a pin on the raised portion of said basket for fitting within said seat to removably pivot said basket.

9. In a dish-washer, the combination with a receptacle or pan, of a removable frame within said pan, a basket within said pan, means for removably pivoting said basket to said frame above the bottom of the basket, and means for adjusting said frame against the sides of said pan.

10. In a dish-washer, the combination with a receptacle or pan, of a removable frame within said pan having radial spring-supporting wires, a basket within said pan, means for removably pivoting said basket to said frame above the bottom of the basket, and bent portions on the said wires for adjusting said frame against the sides of said pan.

In testimony whereof I, the said MINNA VIRGINIA TRIMBLE, have hereunto set my hand.

MINNA VIRGINIA TRIMBLE.

Witnesses:
J. N. COOKE,
WM. R. McCOMMON.